United States Patent
Lerner et al.

[15] 3,700,774
[45] Oct. 24, 1972

[54] DIAZEPAM AND PROPANTHELINE COMPOSITION

[72] Inventors: Irwin Lerner, West Caldwell; Robert Paul McGrath, Wayne, both of N.J.

[73] Assignee: Hoffman-La Roche Inc., Nutley, N.J.

[22] Filed: Oct. 30, 1970

[21] Appl. No.: 85,746

Related U.S. Application Data

[63] Continuation-in-part of Ser. No. 793,546, Jan. 23, 1969, abandoned.

[52] U.S. Cl..................................424/244, 424/283
[51] Int. Cl...............................................A61k 27/00
[58] Field of Search............................424/244, 283

[56] References Cited

OTHER PUBLICATIONS

American Drug Index, (1968) pp. 194 & 501.
Chem. Abst. (1) 63–22815g (1965).
Chem. Abst. (2) 66–103922u (1967).

*Primary Examiner*—Stanley J. Friedman
*Attorney*—Samuel L. Welt, Jon S. Saxe, Bernard S. Leon, Gerald S. Rosen, R. Hain Swope and William M. Farley

[57] ABSTRACT

Compositions comprising diazepam and propantheline halide, useful in treating gastrointestinal disorders are disclosed.

4 Claims, No Drawings

DIAZEPAM AND PROPANTHELINE COMPOSITION

RELATED APPLICATIONS

This application is a continuation-in-part application of U.S. Pat. application, Ser. No. 793,546, filed Jan. 23, 1969 now abandoned.

DETAILED DESCRIPTION OF THE INVENTION

The present invention relates to compositions which are therapeutically useful in the treatment of gastrointestinal disorders. Examples of gastrointestinal disorders amenable to treatment by the compositions of this invention include peptic ulcer, hyperchlorhydria, ulcerative or spastic colon, "nervous stomach," irritable spastic colon, mucous colitis, duidenitis, gastritis, biliary dyskinesia, pylorospasms, cardiospasm, anxiety states having gastrointestinal manifestations and other functional or organic disorders of the digestive tract.

The present invention relates more specifically to compositions comprising 7-chloro-1,3-dihydro-1-methyl-5-phenyl-2H-1,4-benzodiazepin-2-one, hereinafter referred to as diazepam, and $\beta$-diisopropylaminoethyl xanthene-9-carboxylate methohalide, hereinafter referred to as propantheline halide.

The combination of diazepam or an acid addition salt thereof with a pharmaceutically acceptable acid and propantheline halide has been found to be extremely effective in the therapeutic treatment of gastrointestinal disorders such as peptic ulcer and the like. This effectiveness is the result of the complete anticholinergic action of propantheline halide plus the ability of diazepam to effectively relieve the anxiety-tension syndrome often manifest with gastrointestinal disorders of the type described previously.

In addition to the free base of diazepam, any salt thereof with a conventional pharmaceutically acceptable acid, such acid being organic or inorganic in nature, may be utilized in forming the compositions of the present invention. For example, one can use a salt of diazepam with an inorganic acid such as hydrochloric acid, hydrobromic acid, sulfuric acid, nitric acid, phosphoric acid or the like or a salt with an organic acid such as acetic acid, benzoic acid, lactic acid, malic acid, benzene or toluene sulfonic acid, maleic acid, salicylic acid and the like. The preferred salt of diazepam for forming the compositions for the present invention is the hydrochloride.

In formulating the compositions of the present invention, the use of "propantheline halide" indicates a member of the group consisting of propantheline chloride, bromide and iodide with the bromide being preferred.

The compositions of the invention are prepared by mixing together the two active components and, optionally, pharmaceutical adjuvants, and forming the resulting mixtures into suitable oral dosage forms, e.g., pressed or coated tablets. Moreover, the compositions of the present invention can be formulated into solutions, syrups, oily suspensions and the like. Additionally, the compositions of the present invention can be provided in the form of hard shell capsules. If desired, the compositions of the present invention can be formulated into dosage forms suitable for parenteral administration. The methods and techniques by which these various dosage forms are prepared are the conventional procedures of the art. The applications of such procedures to the compositions of the present invention will be readily apparent to one skilled in the art.

In formulating the compositions of the present invention into the aforementioned dosage forms, one can use, as optional ingredients, any of the various adjuvants or excipients ordinarily employed in formulating pharmaceutical products. Thus, for example, in the formulation of tablets, these optional ingredients include fillers such as coprecipitated aluminum hydroxide-calcium carbonate, dicalcium phosphate, lactose and the like; disintegrating agents such as maize starch; and lubricating agents such as talc, calcium stearate and the like. Where the compositions of the present invention are to be provided in the form of solutions, syrups, suspensions in oil, etc., examples of conventional adjuvants and excipients employed include water, sugar syrup, vegetable oils such as arachis oil, suitable edible suspending agents, suitable edible sweetening agents and preservatives of the type well known in the pharmaceutical art.

The active ingredients of the invention can also be used in rectal suppository form by mixing them with suppository adjuvant materials, e.g., fatty acid esters of glycerine, or glycols, e.g., cocoa butter, propylene glycol monostearate, by techniques well known to the art.

The ratio of active ingredients which comprise the compositions of the instant invention may vary over a considerable range, for example, from about one to about 25, preferably from about three to about seven and one-half parts by weight of propantheline halide per each part by weight of diazepam or the equivalent amount of a salt thereof with a pharmaceutically acceptable acid. A typical adult dosage of the active ingredients of the present invention constitutes from about 1 mg. to about 25 mg., preferably from about 2 mg. to about 10 mg. of diazepam or the equivalent amount of a salt thereof with a pharmaceutically acceptable acid and from about 5 mg. to about 30 mg., preferably from about 7 ½ mg. to about 15 mg. of propantheline halide. For example, a tablet containing as active ingredients 5 mg. of diazepam and 15 mg. of propantheline bromide would in most therapeutic situations be administered to an adult patient three or four times daily. Smaller dosages are, of course, utilized for children or elderly or debilitated patients. The above ranges are not critical and dosages outside these ranges can be employed since the specific dosages and relative amounts of active ingredients depend upon the condition being treated and the needs of the patient.

The efficacy of the novel compositions of the present invention has been extensively demonstrated in clinical investigations with patients exhibiting a variety of functional gastrointestinal disorders. One such clinical study has demonstrated the unexpected efficacy of the compositions of the present invention in the treatment of organic gastrointestinal disorders. This study was conducted on a group of nine patients, both male and female between the ages of 32 and 83, afflicted with organic disorders such as duodenal or pyloric ulcers, some of which were of the bleeding variety and all of which had been confirmed by X-ray. Five of these patients received a daily dosage of from 60 mg. to 120 mg. of propantheline bromide. The remaining four patients received a daily dosage of from 3 to 8 tablets each containing 5.0 mg. diazepam and 15.0 mg. propantheline bromide.

The investigator who conducted this study rated the response of three of the four patients receiving a combination of diazepam and propantheline bromide as complete remission and the response of the fourth as slight improvement. Of the five patients receiving only propantheline bromide, two were rated as showing moderate improvement, two as showing slight improvement and the other showed no improvement. These ratings can be transposed to a numerical system as follows: complete remission = 4; marked improvement = 3; moderate improvement = 2; slight improvement = 1; no improvement = 0. These results are unexpected as diazepam is nowhere in the literature indicated or suggested for the treatment of such organic gastrointestinal diseases.

The unexpectedly superior efficacy of the novel compositions of the present invention may be further demonstrated by a comparison of antiulcerogenic activity against either active component administered alone. In this experiment exertation ulcers were produced by a modification of the method of A. Robert et al. (Amer. J. Dig. Dis. 15: 497–507, 1970) in which mice were placed in a wire screen drum 8 ½ inches in diameter. The drum was then rotated at 12 rpm for three hours. The mice were then removed from the drum, sacrificed and the stomachs examined for incidence of ulcers. Groups of five mice each which had been fasted 48 hours received per os gum acacia solution (control), 10 mg./kg. diazepam suspended in gum acacia solution, 30 mg./kg. propantheline bromide suspended in gum acacia solution and a combination of 10 mg./kg. diazepam and 30 mg./kg. propantheline bromide in a gum acacia vehicle, respectively. The results of these tests are summarized in Table I.

TABLE I

| Group No. | No. of Animals | Medication | Incidence of Ulcers, % |
| --- | --- | --- | --- |
| 1 | 5 | None | 100 |
| 2 | 5 | Propantheline bromide 30 mg./kg. | 80 |
| 3 | 5 | Diazepam 10 mg./kg. | 60 |
| 4 | 5 | Propantheline bromide 30 mg./kg. plus diazepam 10 mg./kg. | 0 |

The results of these tests clearly demonstrate the superior efficacy of the compositions of the present invention as well as the improved activity in comparison with that of each of the two active components when administered alone.

The following examples are given to illustrate and not limit the invention.

EXAMPLE 1

The following ingredients were blended together thoroughly to form a premix:

| Ingredient | mg/tablet |
| --- | --- |
| Diazepam | 5 mg. |
| Propantheline bromide | 15 mg. |
| Corn starch | 15 mg. |

The premix is then combined and blended with the following ingredients:

| Ingredient | mg/tablet |
| --- | --- |
| Microcrystalline cellulose | 60 mg. |
| Lactose | 104 mg. |
| Magnesium stearate | 1 mg. |

Thereafter, the mixture was compressed into tablets, weighing 200 mg. each, utilizing a 15/32 inch flat-faced beveled edge punch. The tablets were sealed and sugar coated by sealing with shellac, subcoating with syrup and dusting powder, coloring and smoothing with syrup and waxing and polishing.

EXAMPLE 2

The process of Example 1 was carried out using the same quantities of ingredients except that 10 mg. of diazepam was utilized in place of 5 mg. and the tablets weighed 205 mg. each.

EXAMPLE 3

The following ingredients were blended thoroughly for about 15 minutes in a suitable container:

| Ingredient | mg/capsule |
| --- | --- |
| Diazepam | 2 mg. |
| Propantheline | 7 ½ mg. |
| Lactose | 149 ½ mg. |
| Corn Starch | 30 mg. |
| Magnesium Stearate | 1 mg. |
| Talc | 5 mg. |

The above blend was then passed through a Fitzpatrick Comminuting Machine and then blended for an additional 5 minutes. The mixture was then filled into hard-shell capsules, each of which contained about 195 mg. of the composition.

EXAMPLE 4

The process of Example 3 was carried out using the same quantities except that 7 ½ mg. of lactose was replaced with 7 ½ mg. of propantheline, thus bringing the promantheline content of each 195 mg. capsule to 15 mg.

EXAMPLE 5

Five mg. of diazepam hydrochloride, 15 mg. of propantheline bromide, 38.45 mg. of white beeswax, 96.1 mg. of polyoxyethylene sorbitan mono-oleate (Tween 80) and 1105.45 mg. of propylene glycol monostearate were mixed together, heated and shaped into the form of a rectal suppository.

Variations in the process and compositions of the invention can be undertaken by those skilled in the art without departing from either the scope or spirit of the invention.

We claim:

1. A therapeutic composition for the treatment of gastrointestinal disturbances in humans comprising a therapeutically inert factor consisting of a pharmaceutically acceptable carrier and a therapeutically active factor consisting of three parts by weight propantheline halide and one part by weight of diazepam or the equivalent amount of a salt thereof with a pharmaceutically acceptable acid.

2. A therapeutic composition according to claim 1 wherein said salt of diazepam with a pharmaceutically acceptable acid is the hydrochloride salt and said propantheline halide is propantheline bromide.

3. A therapeutic composition in accordance with claim 1 in unit dosage form suitable for internal administration wherein said therapeutically active factor in each dosage unit consists essentially of 5 mg. diazepam or a sufficient amount of a pharmaceutically acceptable salt thereof to provide 5 mg. of diazepam and 15 mg. of propantheline halide.

4. A composition in accordance with claim 3 wherein said propantheline halide is propantheline bromide.

* * * * *